US009862575B2

(12) United States Patent
Schulz et al.

(10) Patent No.: US 9,862,575 B2
(45) Date of Patent: Jan. 9, 2018

(54) LINK CHAIN OF A MOVING WALKWAY OR AN ESCALATOR

(71) Applicant: Inventio AG, Hergiswil (CH)

(72) Inventors: Robert Schulz, Vienna (AT); Thomas Illedits, Neufeld (AT); Michael Matheisl, Vösendorf (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/314,177

(22) PCT Filed: May 13, 2015

(86) PCT No.: PCT/EP2015/060616
§ 371 (c)(1),
(2) Date: Nov. 28, 2016

(87) PCT Pub. No.: WO2015/180965
PCT Pub. Date: Dec. 3, 2015

(65) Prior Publication Data
US 2017/0210602 A1 Jul. 27, 2017

(30) Foreign Application Priority Data
May 28, 2014 (EP) .................................... 14170276

(51) Int. Cl.
*B66B 23/14* (2006.01)
*B66B 23/02* (2006.01)
(Continued)

(52) U.S. Cl.
CPC ............ *B66B 23/145* (2013.01); *B65G 17/24* (2013.01); *B65G 39/20* (2013.01); *B66B 23/024* (2013.01); *B66B 23/147* (2013.01)

(58) Field of Classification Search
CPC ... B66B 23/022; B66B 23/024; B66B 23/145; B66B 23/147; B65G 17/24; B65G 39/20
(Continued)

(56) References Cited

U.S. PATENT DOCUMENTS 449,997 A * 4/1891 Brampton ............... F16G 13/06
474/231
2,103,327 A * 12/1937 Handy .................. B66B 23/145
198/332

(Continued)

FOREIGN PATENT DOCUMENTS

CN 102666352 A 9/2012
DE 19849236 A1 2/2000
(Continued)

*Primary Examiner* — Gerald McClain
*Assistant Examiner* — Keith R Campbell
(74) *Attorney, Agent, or Firm* — William J. Clemens; Shumaker, Loop & Kendric, LLP

(57) ABSTRACT

An escalator has a step belt or moving walkway has a plate belt, wherein the belt includes at least one link chain arranged to circulate between a first deflecting region and a second deflecting region of the escalator or the moving walkway. Guide rollers as well as steps or plates are arranged at the link chain. The link chain additionally includes system rollers. The guide rollers and the system rollers are arranged on at least three tracks lying adjacent to one another with respect to a direction of circulation of the link chain, wherein one of the tracks is occupied by the guide rollers and at least two of the tracks are occupied by the system rollers.

10 Claims, 3 Drawing Sheets

(51) Int. Cl.
*B65G 17/24* (2006.01)
*B65G 39/20* (2006.01)

(58) Field of Classification Search
USPC .......................................................... 198/330
See application file for complete search history.

(56) References Cited

U.S. PATENT DOCUMENTS

| | | | |
|---|---|---|---|
| 4,883,160 A | | 11/1989 | Sansevero et al. |
| 4,930,622 A | | 6/1990 | Sansevero |
| 5,819,910 A | * | 10/1998 | Langer .................... B66B 23/02 198/330 |
| 6,834,754 B2 | * | 12/2004 | Pietz ....................... B66B 23/02 198/330 |
| 7,918,326 B2 | * | 4/2011 | Illedits .................. B66B 23/022 198/330 |
| 9,394,143 B2 | * | 7/2016 | Makovec .............. B66B 23/022 |
| 2012/0168277 A1 | * | 7/2012 | Senger ................... B66B 23/00 198/321 |

FOREIGN PATENT DOCUMENTS

| | | |
|---|---|---|
| EP | 1876135 A1 | 1/2008 |
| GB | 491301 A | 8/1938 |

\* cited by examiner

LINK CHAIN OF A MOVING WALKWAY OR AN ESCALATOR

FIELD

The invention relates to an escalator with a step belt or a moving walkway with a plate belt. The step belt or plate belt includes at least one link chain at which steps or plates are arranged.

BACKGROUND

Escalators and moving walkways are subject to high, changing levels of load by strongly fluctuating numbers of users and have long operating times of 10 to 18 hours per day. In buildings with public traffic such as, for example airports, railway stations or underground stations, escalators and moving walkways can even be in permanent use around the clock. Accordingly, the moved parts of these items of transport equipment are exposed to high levels of wear and therefore have to be intensively and thoroughly maintained. Link chains of the plate belt or of the step belt as well as the chainwheels arranged in the deflecting regions are parts with high levels of wear (wear parts) which have to be periodically replaced. A chainwheel serves for deflection of the runs of the link chain in dependence on running direction of the step belt or plate belt from a forward run to a return run or from the return run to the forward run. In addition, the link chain can be driven by a chainwheel. Guide rollers are usually fastened to the link chains in order to guide the plate belt or step belt at least in the forward run by means of guide rails arranged between the deflecting regions and to provide support against gravitational force.

Link chains with guide rollers of this category are disclosed in, for example, U.S. Pat. Nos. 4,883,160 A, 4,930,622 A and GB 491 301 A.

Escalators and moving walkways of flat construction have been increasingly developed in recent years. These have many advantages in terms of constructional engineering for customers. For example, in the case of escalators with low constructional heights it is possible to dispense with a pit in the floor or only a pit with a small depth is still necessary. Escalators with smaller constructional heights can be installed more easily in existing buildings, since the installation space available from the removed, old escalator is usually sufficient. In a given case the support structure of the escalator to be replaced can be left and the new escalator inserted into the old support structure or framework.

In order to build an escalator or moving walkway of flat construction it is necessary, in particular, to reduce the diameter of the conveying chainwheel and the deflecting chainwheel. This leads to a substantial deflection of the chain links or chain link straps of the link chain in the region of the deflecting chainwheel or conveying chainwheel. Moreover, for the same pitch, but with decreasing pitch circle diameter of the chainwheel and thus with increasing tooth number, the so-called polygon effect increases, i.e. a non-uniform movement of the step belt or plate belt. Various measures for elimination of polygon effect are disclosed in, for example, EP 1 876 135 B1.

These measures enable use of long chain link straps or chain links together with small deflecting chainwheels and conveying chainwheels without a polygon effect occurring or with this being barely detectable at least by the users. However, the lengthy articulation point spacings of the link chain additionally increase the deflection angle at the articulation points and for a predetermined pitch circle diameter at the circumference of the chainwheel less teeth are in engagement with the link chain, as a consequence of which the area pressure at the guide rollers and thus wear thereof is substantially higher than in the case of chainwheels with the same pitch and larger pitch circle diameter. Guide rollers of steel, which are more wear-resistant than plastics material guide rollers, are in fact also mentioned in EP 1 876 135 B1, but these steel rollers cause a considerable amount of operational noise on the guide rails.

SUMMARY

It is therefore an object of the present invention to create, at least in the deflecting regions, a moving walkway or an escalator of flat construction, the link chains of which together with guide rollers have a high service life and a smooth, low-noise running.

This object is fulfilled by an escalator with a step belt or a moving walkway with a plate belt, wherein the step belt or plate belt has at least one link chain or conveying chain, which is arranged to circulate between a first deflecting region and a second deflecting region of the escalator or moving walkway. Guide rollers as well as steps or plates are arranged at the link chain. The link chain additionally comprises system rollers, wherein the guide rollers and system rollers are arranged on at least three tracks lying adjacent to one another with respect to the direction of circulation of the link chain. One of the tracks is occupied by the guide rollers and at least two of the tracks are occupied by the system rollers.

The feature "track" denotes, in the sense of the present invention, a movement space which extends parallel to the length dimension or circulation direction of the plate belt or step belt and in which only the guide rollers or system rollers associated with this track move. Consequently, the guide rollers or system rollers allocated to the other tracks never move in this movement space, but move in the movement spaces associated therewith. Another designation for track could also be guide path or movement path. Through the apportioning of the guide rollers and system rollers, which are arranged at the link chain, to three tracks the load situations and functions which arise are divided up amongst the tracks and the properties of the guide rollers or system rollers can be optimally matched to the load situations arising in the track thereof, for example by means of calculations and tests.

For example, the guide rollers associated with a track can roll between the deflecting regions on guide rails or guide paths and thereby support the step belt or plate belt against gravitational force, whereas the system rollers arranged in the other tracks are set free and thus unloaded at least in sections between the deflecting regions. The guide rollers, which, for example are made of plastics material, make possible very low-noise running of the step belt or plate belt on the guide rails, whereas the system rollers, for example made of steel, at least in the set-free sections are without contact with a stationary part of the escalator of the moving walkway and therefore do not cause any loud running noises. In the deflecting regions the system rollers of at least one of the tracks can be in engagement with a chainwheel of the deflecting region and the guide rollers set free so that the guide rollers are not overloaded, since in the deflecting regions the tension force of a tensioning device of the plate belt or step belt and the propulsion force of the chainwheel driven by the drive are distributed to only a few system rollers. Since the system rollers in the deflecting region make only a few revolutions, only a very small amount of noise arises. The system rollers can obviously also be made from at least one of the following mentioned materials, for example from stainless steel, sintered metal, bronze, brass, copper and/or high-strength hard synthetic materials.

If the system rollers of only one track are guided by way of a chainwheel the system rollers of the second track can, for example, be supported on a deflection curve of the deflecting region. In the respective deflecting region the system rollers can, for example, rest on a base circle of the chainwheel. In order to largely eliminate the polygon effect according to the teaching of EP 1 876 135 B1 the base circle radius can be smaller than a radius of the deflection curve.

A chainwheel, which corresponds with the two tracks and is thus in engagement with the system rollers of the two tracks, can obviously also be present in the deflecting region. In that case the base circle diameter of the two tracks of this chainwheel can be dimensioned to be of different size.

The system rollers and guide rollers are preferably arranged at the articulation points of the link chain, whereby a directionally stable guidance of the individual chainwheels of the link chain is made possible.

Other arrangements are obviously also possible, for example such that the system rollers are arranged at articulation points of the link chain and the guide rollers are respectively arranged between the articulation points at the chain link straps of the link chain.

The link chain is preferably formed from chain links with chain link straps which are arranged parallel to one another and spaced from one another transversely to the length direction of the chain links. As a result, for example, the system rollers can be arranged between the chain link straps of the link chains and the guide rollers at an outer side of the chain links or chain link straps of the link chain.

In order to be able to use as many parts as possible and thereby minimisc minimize the number of different parts in the finished product the system rollers of at least one link chain can be of stepped construction, in which case these have a first roller diameter in a first half of their roller width and a second roller diameter, which is smaller with respect to the first roller diameter, in a second half of their roller width. With respect to their stepped form these system rollers can be so arranged at the link chain that the first track is occupied by a first part of the system rollers with their first roller diameters and the second track is occupied by a second part of the system rollers with their first roller diameters.

The system rollers obviously do not necessarily have to be of stepped construction. They can also be of discoid construction like the guide rollers. System rollers of that kind of construction of the at least one link chain can also be divided into first system rollers and second system rollers, and the first system rollers arranged at the link chain to be offset with respect to the second system rollers in alternating sequence so that two mutually adjacent tracks are occupied by the first system rollers and the second system rollers. The alternating sequence can take place in different ways. The first possibility consists of arranging the first system rollers between the chain link straps of the chain links and the second system rollers at an outer side of the link chain. The second possibility consists of arranging both the first and second system rollers between the chain link straps of the chain links and producing the alternating sequence by means of spacer sleeves or intermediate elements.

However, the system rollers can serve for supporting and guidance of the step belt or plate belt not only in the deflecting regions. They can also be utilized for relief of the guide rollers of load in sections. In order to achieve this at least one support rail can be arranged, parallel to a length section of the guide rail or guide path, in the region of at least one of the two tracks occupied by system rollers so as to support the system rollers rolling over the support rail. These support rails, which are, for example, arranged in deflecting regions of the escalator or the moving walkway, can in that case accept or support a part of the high forces arising in these sections and acting on the guide rollers. In order to achieve a balanced apportioning between the guide rollers made from, for example, plastics material and the system rollers made from, for example, steel the support rail or at least the guide surface thereof can be made of plastics material. Moreover, a support rail made of plastics material also damps the operational noise of the escalator or the moving walkway in this section. The support rails can obviously also be made of stainless steel, bronze, brass, copper and/or high-strength hard synthetic materials.

The link chains described in the foregoing can obviously be used not only in new moving walkways or escalators. For example, an existing moving walkway or an existing escalator can be modernized in that the existing plate belt or step belt is replaced by a plate belt or step belt with the aforedescribed multi-track link chains. In a given case the deflecting regions, guide rails and chainwheels have to be adapted to the new link chains.

It is obviously also possible in these reconstructed escalators and moving walkways for at least one support rail to be arranged, parallel to at least one length section of at least one guide rail arranged between the deflecting regions, in the region of at least one of the tracks occupied by system rollers so as to support the system rollers rolling over the support rail.

DESCRIPTION OF THE DRAWINGS

The escalator or the moving walkway with at least one link chain with guide rollers or system rollers divided up amongst at least three tracks is explained in more detail in the following by way of embodiments and with reference to the drawings, in which.

DETAILED DESCRIPTION

Figure 1:
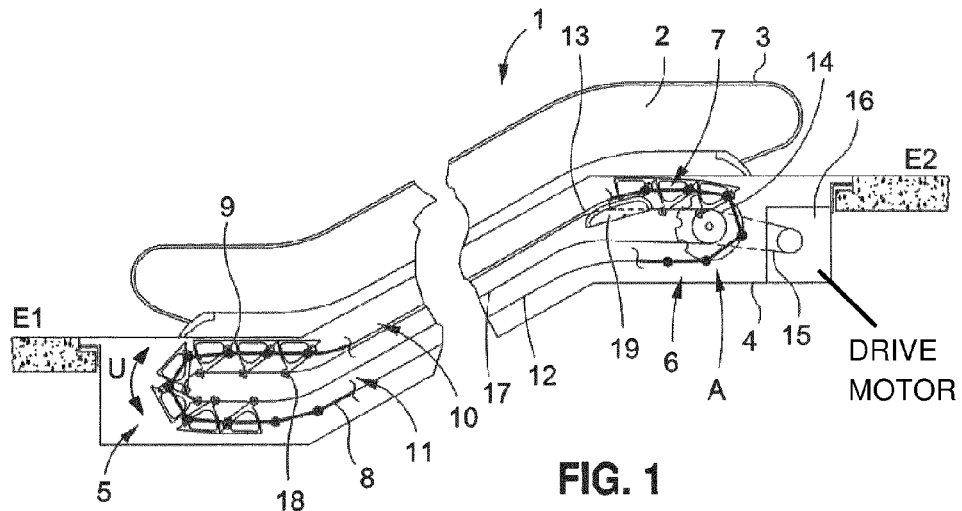
FIG. 1 shows, in side view and in schematic illustration, an escalator which comprises a circulating step belt arranged between a first deflecting region and a second deflecting region.

FIG. 1 shows, schematically and in side view, an escalator 1 with a balustrade 2 and with a handrail 3 running around the balustrade 2. The escalator 1 connects a lower floor E1 with an upper floor E2, wherein a support structure 4, which is formed as a framework, serves as support for the balustrade 2 and as an installation frame for further components of the escalator 1. The support structure 4 additionally has a first deflecting region 5 and a second deflecting region 6. A step belt 7 is arranged in the support structure 4 to circulate between the first deflecting region 5 and the second deflecting region 6. The direction U of circulation of the step belt 7 can be selectable as desired for conveying upwardly or conveying downwardly. The step belt 7 comprises at least one link chain 8, which is illustrated only partly in FIG. 1 and at which steps 9 are arranged. The step belt 7 has a forward run 10, by means of which persons and objects are transported and a return run 11, which serves for return guidance of the steps 9. The steps 9 and the link chain 8 are guided in the forward run 10 by means of guide rails 13 and in the return run 11 by means of guide rails 12. In the case of escalators 1, in addition guide rails 17 are usually present, which guide the drag rollers 18, which are arranged at the steps 9, between the deflecting regions 5, 6.

At least one chainwheel or deflection guide, which for reasons of clarity is illustrated here only schematically, is arranged in the first deflecting region 5 for deflection of the step belt 7. A chainwheel 14, which is connected with a drive motor 16 by means of a drive train 15, is arranged in the second deflecting region 6. The chainwheel 14 engages in the link chain 8 and thereby mechanically positively transmits the rotational movement of the drive motor 16 to the link chain 8 and thus to the step belt 7.

Figure 4:
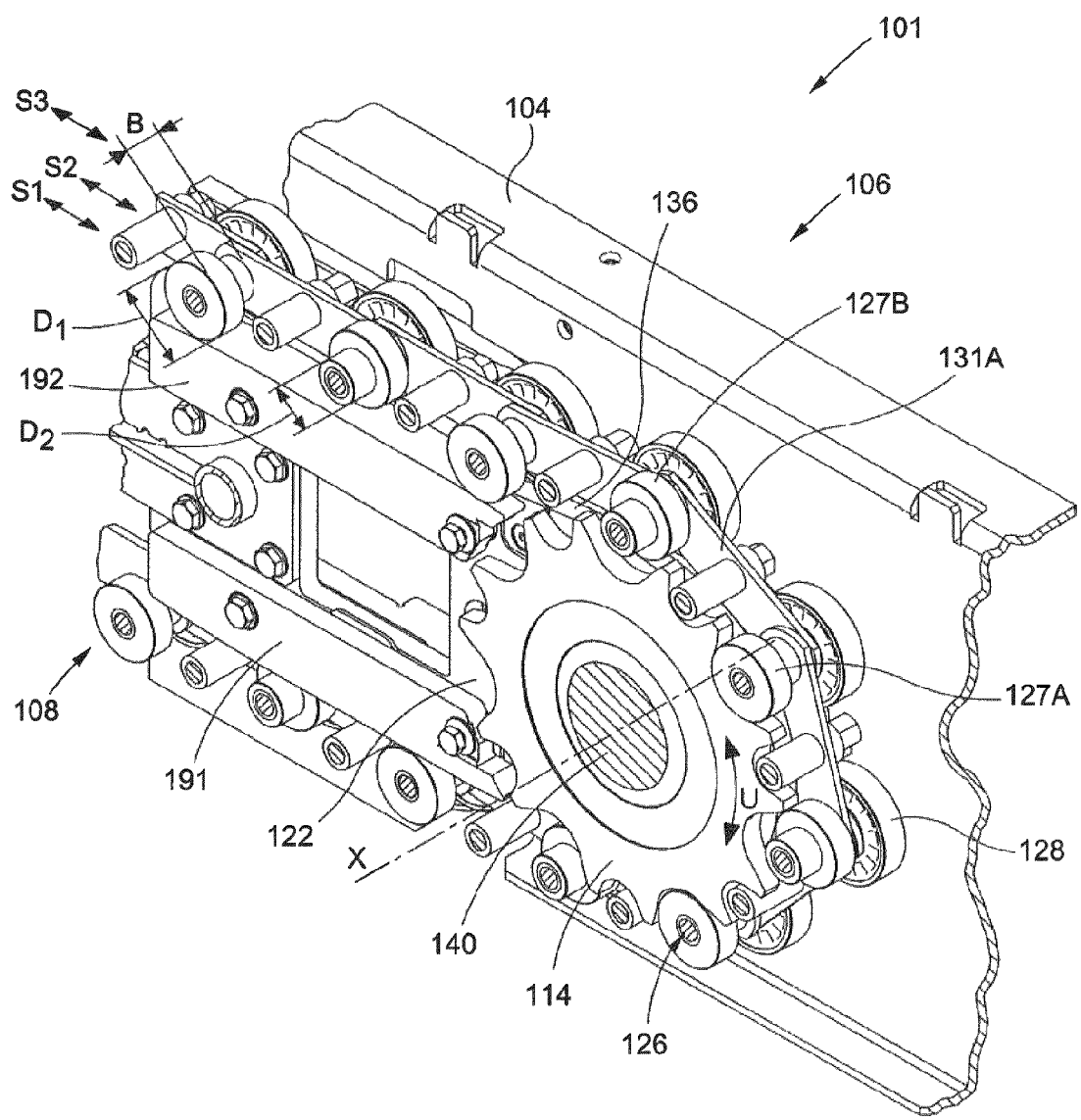
FIG. 4 shows, in three-dimensional view, the deflecting region, which is illustrated in FIG. 3, in accordance with the vertical sectional plane C-C indicated in FIG. 3.

In addition, a support rail 19, the function of which is described in more detail in connection with FIG. 4, is indicated in the second deflecting region 6.

Figure 2:
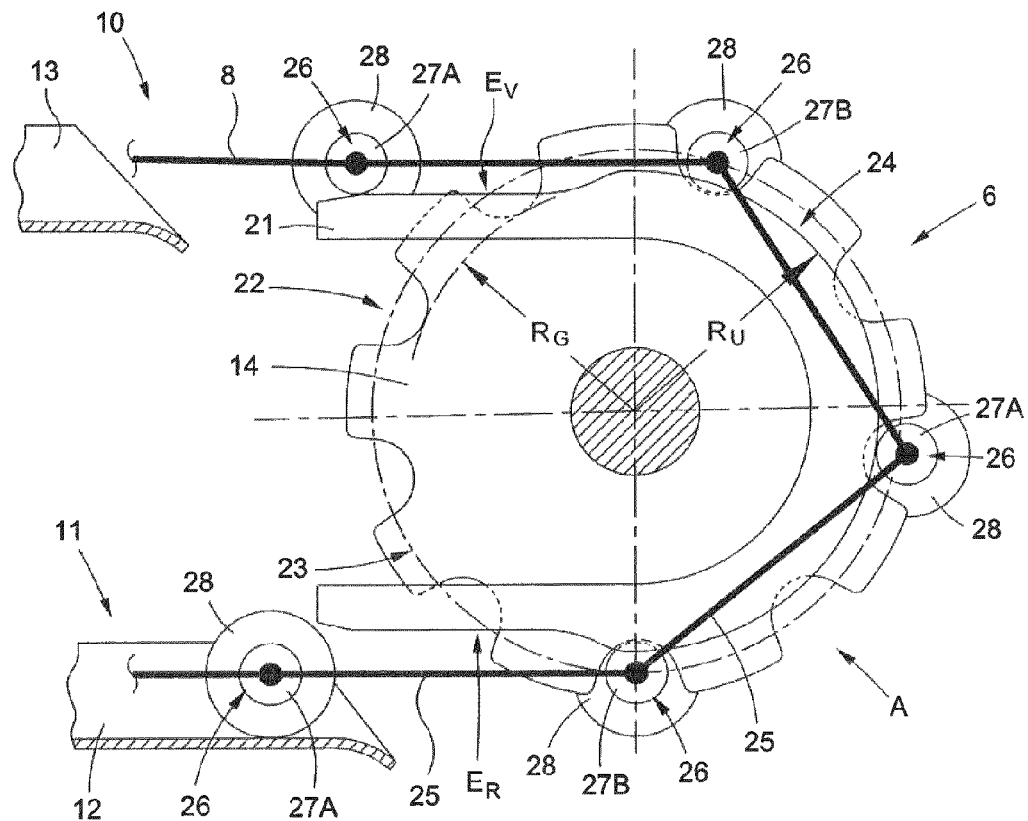
FIG. 2 shows, in side view and in schematic illustration, a chainwheel of the second deflecting region illustrated in FIG. 1 as well as a part of a link chain of the step belt.

The detail view A of FIG. 1 is illustrated to enlarged scale in FIG. 2 and schematically shows the link chain 8 which is guided around the chainwheel 14 of the deflecting region 6. The link chain 8 is, for the sake of better clarity, illustrated schematically and includes chain link straps 25 and articulation points 26, as well as system rollers 27A, 27B and guide rollers 28 arranged in the region of the articulation points 26.

With reference to the image plane of FIG. 2 the system rollers 27A, 27B and the guide rollers 28 are arranged at different planes with respect to the eye of the observer and thus on different tracks. Different parts of the deflecting region 6 are also associated with these tracks. A plate cam 21 and the first system rollers 27A are arranged on the plane or track closest to the eye of the observer. The first system rollers 27A thus run over the deflecting cam 21 in the deflecting region 6.

The chainwheel 14 as well as the second system rollers 27B are arranged on the plane or track disposed thereunder. The second system rollers 27B lie, in the deflecting region 6, in the tooth gaps 22 of the chainwheel 14 on a base circle radius $R_G$, wherein the pivot axes, which are arranged orthogonally to the image plane, of the articulation points 26 lie on the pitch circle diameter 23.

The guide rollers 28 as well as the guide rails 12, 13 connected with the deflecting region 6 are arranged on the plane or track lying furthest away from the eye of the observer.

On the assumption that the conveying chainwheel 14 rotates in clockwise sense the guide rollers 28 continuously leave the guide rail 13 of the forward run 10 and come back into contact with a part of the escalator 1 only when they reach the guide rail 12 of the return run 11. The first system rollers 27A unloaded up to the deflecting region 6 roll over a guide surface 24 of the deflection cam, wherein this guide surface 24 goes over from an almost straight introduction path $E_v$ of the forward run 10 into a deflection radius $R_u$ and from this deflection radius $R_u$ back into an almost straight introduction path $E_R$ of the return run 11.

Moreover, in the region of the chainwheel 14 looped around by the link chain 8 the second system rollers 27B come into contact with the tooth gaps 22 and there lie at the base circle $R_G$. Since this base circle $R_G$ is smaller than the deflection radius $R_u$ the pivot axes of the articulation points 26, at which first system rollers 27A are arranged, move not only on the pitch circle diameter 23 of the chainwheel 14, but also on a curve predetermined by the shape of the guide surface 24 and the diameter of the first system rollers 27A. By virtue of this design a chainwheel 14 with small base circle diameter $R_G$ can be combined with a link chain 8 with widely spaced-apart articulation points 26 without occurrence of a significant polygon effect. In that case, the polygon effect is eliminated exclusively by the highly loadable system rollers 27A, 27B according to the teaching of EP 1 876 135 B1, whilst the guide rollers 28 made of plastics material or having plastics material bands run through the deflecting regions 5, 6 completely without loading.

Figure 3:
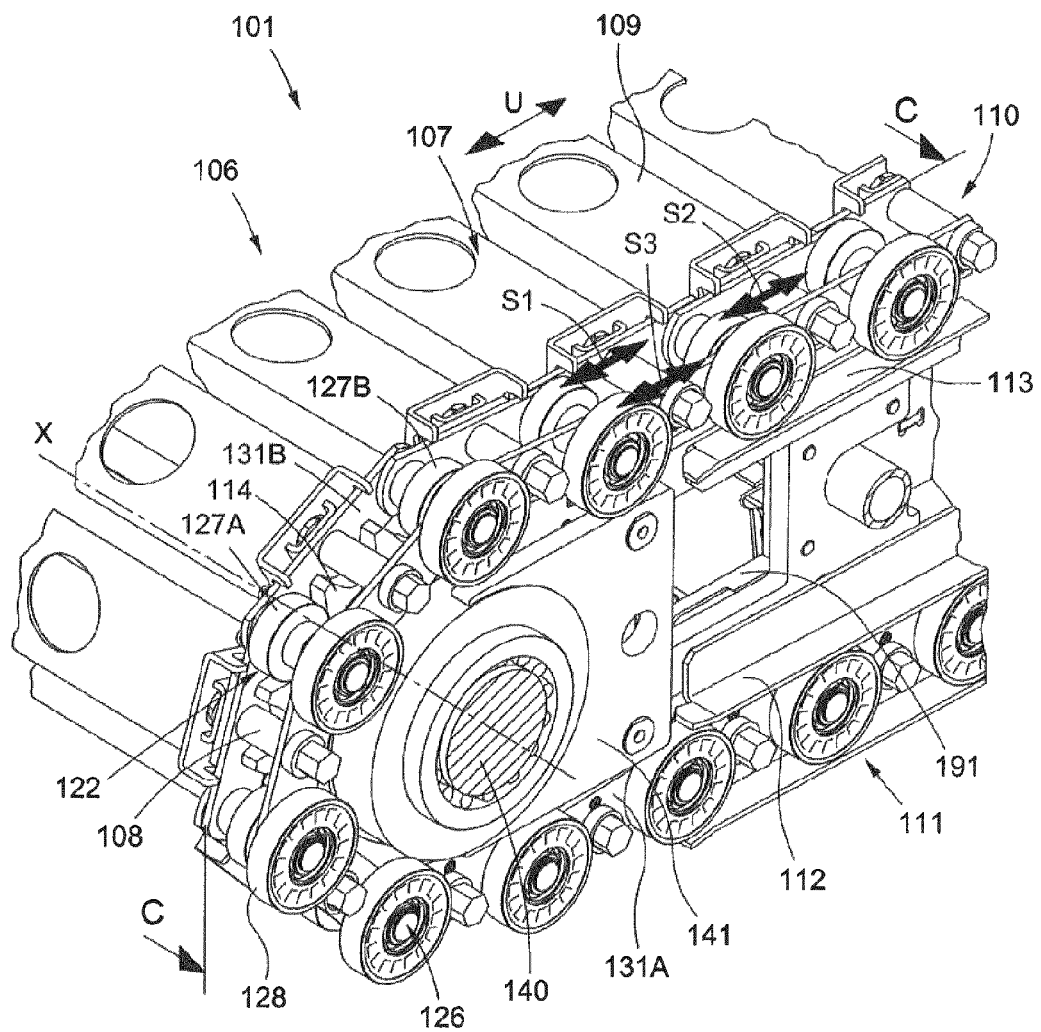
FIG. 3 shows, in three-dimensional view, a deflecting region of a moving walkway with a conveyor chainwheel, a deflecting cam and with a link chain having stepped system rollers.

FIG. 3 shows, in three-dimensional view, a deflecting region 106 of a moving walkway 101 (not illustrated further) with a plate belt 107. Moving walkways 101 differ from escalators in basic construction only in a few areas. The significant difference resides in the fact that moving walkways 101 have a plate belt instead of a step belt and do not need guide rails like the escalators in order to guide the drag rollers of the steps.

FIG. 3 shows, with respect to the length direction of the moving walkway 101, only the right-hand half of the plate belt 107 and the deflecting region 106. The left-hand half, which is not illustrated, of the deflecting region 106 and the plate belt 107 is constructed with mirror-image symmetry with respect to the right-hand half. The present embodiment thus comprises two mutually parallel link chains 108 which are arranged to circulate between two deflecting regions 106 and between which a plurality of plates 109 connecting the two link chains 108 together are arranged. For reasons of clarity only the base bodies of the plates 109, without tread plates fastened thereto, are illustrated. The plate belt 107 is thus of substantially the same construction as a step belt, wherein instead of steps the plates are arranged at at least one deflecting chain 108. The direction U of circulation of the plate belt 107 is similarly selectable as desired in both possible directions. The link chain 108 comprises a plurality of chain link straps 131A, 131B which are connected together by articulation points 126. Arranged at each of the articulation points 126 is either a first system roller 127A or a second system roller 127B between the chain link straps 131A, 131B. The first system rollers 127A and the second system rollers 127B are components of identical construction and differ only by way of the installation position thereof between the chain link straps 131A, 131B.

In order to illustrate further regions, which are concealed in FIG. 3 by parts of the deflecting region 106 and the plate belt 107, FIG. 4 shows a three-dimensional view of the deflecting region 106, which is illustrated in FIG. 3, in the vertical section plane C-C indicated there. The two FIGS. 3 and 4 are described together in the following with use of the same reference numerals.

The system rollers 127A, 127B of the at least one link chain 108 are of stepped construction and can have, as illustrated, an entirely identical design. They have a first roller diameter $D_1$ in the first half of their system roller width B and a second roller diameter $D_2$, which is smaller with respect to the roller diameter $D_1$, in the second half of their system roller width B. The system rollers 127A, 127B are arranged by their stepped form in alternation between the chain link straps 131A, 131B so that the first system rollers 127A move by their first roller diameters $D_1$ on a first track $S_1$ and the second system rollers 127B move by their first roller diameters $D_1$ on a second track $S_2$.

A chainwheel 114 is arranged in the deflecting region 106 to be rotatable about an axis X of rotation. The conveying chainwheel 114 is aligned with the first track $S_1$ and has almost the track width thereof. Near the conveying chainwheel 114 and aligned with the second track $S_2$ is a deflecting cam 136 which is just visible only in FIG. 4. The cam center point of the deflecting cam 136 is aligned precisely with the axis X of rotation of the conveying chainwheel 114. Although the pitch of the chainwheel 114 corresponds with the spacings of the articulation points 126, by virtue of their stepped roller diameters $D_1$, $D_2$ and the alternating arrangement only the first system rollers 127A engage by the first roller diameter $D_1$ thereof in the tooth gaps 122 of the conveying chainwheel 114. Since the second diameters $D_2$ are substantially smaller than the first diameters $D_1$, the second diameters $D_2$ of the first system rollers 127A do not contact the deflecting cam 136. The second system rollers 127B roll by their first roller diameters $D_1$ over the deflecting cam 136, whereby the second roller diameter $D_2$ thereof remains at a spacing from the chainwheel 114 in the entire deflecting region 106.

Exclusively guide rollers 128 move on the third track $S_3$. The guide rollers 128 of the plate belt 107 are guided between the two deflecting regions 106 of the moving walkway 101 on guide rails 112, 113 and support the plate belt 107 against gravitational force. As apparent from FIG. 3, the guide rails 113 of the forward run 110 and the guide rails 112 of the return run 111 end directly in front of the deflecting region 106. The guide rollers 128 are completely set free and therefore unloaded in the deflecting region 106.

The roller body of the guide roller 128 can be made from several materials so that, for example, the guide surface or band thereof is made of plastics material and the roller body or rim thereof is made of metal, for example steel. Other materials such as aluminum, bronze, and glass-fiber-reinforced, aramid-fiber-reinforced and carbon-fiber-reinforced synthetic materials are obviously also usable for producing roller bodies and their characteristics can be appropriately combined with one another. The same obviously also applies to the roller bodies of the system rollers, wherein due to the loading which arises in the deflecting region 106 and with respect to production costs use is preferably made of a roller body completely produced from steel.

One of two support rails 191, 192, which are arranged parallel to the guide rails 112, 113, can be seen in FIG. 3. The two support rails 191, 192 can be seen much better in FIG. 4. The support rails 191, 192 are formed to be of such width that they serve not only in the first track $S_1$, but also in the second track $S_2$ as support for the first system rollers 127A and the second system rollers 127B and thereby in this section (which substantially corresponds with the length of the support rails 191, 192) support the plate belt 107 together with the guide rollers 128 relative to gravitational force. The support rails 191, 192 can be made of metal, but also from a synthetic material. Insofar as the system rollers 127A, 127B are made of steel, for the purpose of damping of running noise a support rail 191, 192 made at least partly of synthetic material is preferred. The support rails 191, 192 arranged in the deflecting regions 106 can, for example, be settable in their position relative to the chainwheel 114 so that the transitions from the guide rails 112, 113 to the deflecting cam 136 are adjustable as optimally as possible.

FIG. 4 additionally shows that the chainwheel 114 is attached to a shaft 140. The shaft 140 is rotatably mounted in a bearing block 141 illustrated in FIG. 3. The bearing block 141 is fixedly connected with the frame section 104 or support structure section 104 or framework section 104 illustrated in FIG. 4.

As already mentioned in connection with FIG. 1, further support rails 19, 191, 192 can be arranged in sections parallel to the guide rails 12, 13, 112, 113 between the two deflecting regions 5, 6, 106 of an escalator 1 or a moving walkway 101 so as to relieve the guide rollers 28, 128 of load in these sections. Such support rails 19, 191, 192 are also replaceable significantly more quickly and simply than the large number of guide rollers 28, 128 of the step belt 7 or plate belt 107.

Although primarily system rollers and guide rollers were mentioned in the description and the figures show system rollers and guide rollers it is applicable to all embodiments that also slide elements such as, for example, slide skids or slide blocks can be arranged at the link chain in place of system rollers or guide rollers or in combination therewith. All embodiments can be used not only in escalators with a step belt, but also in moving walkways with a plate belt. It is sensible to provide chainwheels for each of the two link chains in the deflecting regions in correspondence with the described embodiments. Insofar as a chainwheel does not have to transmit torque, it can also be replaced by a deflecting cam or by a deflecting curve or tensioning curve.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A belt being a step belt of an escalator or a plate belt of a moving walkway comprising:
   at least one link chain arranged to circulate between a first deflecting region and a second deflecting region of the escalator or the moving walkway;
   a plurality of guide rollers fastened to the at least one link chain;
   a plurality of steps or plates fastened to the at least one link chain;
   a plurality of system rollers fastened to the at least one link chain, wherein the guide rollers and the system rollers are arranged among at least three tracks;
   wherein the at least three tracks are adjacent to one another with respect to a direction of circulation of the at least one link chain;
   wherein one of the at least three tracks is occupied by the guide rollers and at least two other tracks of the at least three tracks are occupied by the system rollers;
   wherein the guide rollers roll on guide rails between the first and second deflecting regions and the system rollers are unloaded at least in sections between the first and second deflecting regions;
   wherein in the first and second deflecting regions the system rollers occupying a first track of the at least two other tracks are in engagement with a chainwheel and the guide rollers are unloaded; and
   wherein in the first and second deflecting regions the system rollers occupying a second track of the at least two other tracks are supported on a deflecting cam.

2. The belt according to claim 1 wherein in the first and second deflecting regions the system rollers lie on a base circle of the chainwheel and the base circle radius is smaller than a radius of the deflecting cam.

3. The belt according to claim 1 wherein the system rollers and the guide rollers are arranged at articulation points of the at least one link chain.

4. The belt according to claim 1 wherein the at least one link chain is formed from chain links, each of the chain links having a pair of chain link straps arranged parallel to one another, the system rollers are arranged between the chain link straps of the respective chain links and the guide rollers are arranged at an outer side of the chain link straps.

5. The belt according to claim 1 wherein the system rollers are arranged at articulation points of the at least one link chain and the guide rollers are arranged between the articulation points at chain link straps of the at least one link chain.

6. The belt according to claim 1 wherein the system rollers are stepped with a first half of a width of each of the system rollers having a first roller diameter and a second half of the width having a second roller diameter smaller than the first roller diameter, and wherein the system rollers are arranged such that the first track of the at least two other tracks is occupied by the first half of the system rollers and a second track of the at least two other tracks is occupied by the second half of the system rollers.

7. The belt according to claim 1 wherein the system rollers include first system rollers and second system rollers, the first system rollers being arranged at the at least one link chain offset in alternating sequence with respect to the second system rollers so that the first track of the at least two other tracks is occupied by the first system rollers and a second track of the at least two other tracks is occupied by the second system rollers, the first one track and the second one track being mutually adjacent.

8. The belt according to claim 1 wherein at least one support rail is arranged parallel to one of the guide rails adjacent at least one of the at least two other tracks occupied by system rollers to support the system rollers rolling over the at least one support rail.

9. A belt being a step belt of an escalator or a plate belt of a moving walkway comprising:
at least one link chain arranged to circulate between a first deflecting region and a second deflecting region of the escalator or the moving walkway;
a plurality of guide rollers fastened to the at least one link chain;
a plurality of steps or plates fastened to the at least one link chain;
a plurality of system rollers fastened to the at least one link chain, wherein the guide rollers and the system rollers are arranged among at least three tracks;
wherein the at least three tracks are adjacent to one another with respect to a direction of circulation of the at least one link chain;
wherein one of the at least three tracks is occupied by the guide rollers and at least two other tracks of the at least three tracks are occupied by the system rollers;
wherein the guide rollers roll on guide rails between the first and second deflecting regions and the system rollers are unloaded at least in sections between the first and second deflecting regions; and
wherein in the first and second deflecting regions the system rollers occupying a first track of the at least two other tracks are in engagement with a chainwheel and the guide rollers are unloaded;
wherein the system rollers are stepped with a first half of a width of each of the system rollers having a first roller diameter and a second half of the width having a second roller diameter smaller than the first roller diameter, and wherein the system rollers are arranged such that the first track of the at least two other tracks is occupied by the first half of the system rollers and a second track of the at least two other tracks is occupied by the second half of the system rollers.

10. A belt being a step belt of an escalator or a plate belt of a moving walkway comprising:
at least one link chain arranged to circulate between a first deflecting region and a second deflecting region of the escalator or the moving walkway;
a plurality of guide rollers fastened to the at least one link chain;
a plurality of steps or plates fastened to the at least one link chain;
a plurality of system rollers fastened to the at least one link chain, wherein the guide rollers and the system rollers are arranged among at least three tracks;
wherein the at least three tracks are adjacent to one another with respect to a direction of circulation of the at least one link chain;
wherein one of the at least three tracks is occupied by the guide rollers and at least two other tracks of the at least three tracks are occupied by the system rollers;
wherein the guide rollers roll on guide rails between the first and second deflecting regions and the system rollers are unloaded at least in sections between the first and second deflecting regions; and
wherein in the first and second deflecting regions the system rollers occupying a first track of the at least two other tracks are in engagement with a chainwheel and the guide rollers are unloaded;
wherein the system rollers include first system rollers and second system rollers, the first system rollers being arranged at the at least one link chain offset in alternating sequence with respect to the second system rollers so that the first track of the at least two other tracks is occupied by the first system rollers and a second track of the at least two other tracks is occupied by the second system rollers, the first one track and the second one track being mutually adjacent.

* * * * *